United States Patent
Bando et al.

(10) Patent No.: US 9,766,350 B2
(45) Date of Patent: Sep. 19, 2017

(54) RELATIVE POSITION CALCULATING SYSTEM FOR WORK MACHINE

(71) Applicant: HITACHI CONSTRUCTION MACHINERY CO., LTD., Tokyo (JP)

(72) Inventors: Mikio Bando, Tokyo (JP); Takayuki Sato, Tsuchiura (JP); Hidefumi Ishimoto, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 56 days.

(21) Appl. No.: 14/772,920

(22) PCT Filed: Jul. 25, 2014

(86) PCT No.: PCT/JP2014/069765
§ 371 (c)(1),
(2) Date: Sep. 4, 2015

(87) PCT Pub. No.: WO2015/016159
PCT Pub. Date: Feb. 5, 2015

(65) Prior Publication Data
US 2016/0018531 A1     Jan. 21, 2016

(30) Foreign Application Priority Data
Jul. 29, 2013    (JP) ................. 2013-156409

(51) Int. Cl.
G01S 19/51     (2010.01)
G01S 19/28     (2010.01)
G01S 19/14     (2010.01)

(52) U.S. Cl.
CPC .............. *G01S 19/51* (2013.01); *G01S 19/14* (2013.01); *G01S 19/28* (2013.01)

(58) Field of Classification Search
None
See application file for complete search history.

(56) References Cited

U.S. PATENT DOCUMENTS

| 5,999,880 A | 12/1999 | Okada et al. |
| 6,263,281 B1 | 7/2001 | Yamamoto et al. |
| 2002/0032525 A1 | 3/2002 | Yoshikawa et al. |

FOREIGN PATENT DOCUMENTS

| JP | 10-148665 A | 6/1998 |
| JP | 11-295411 A | 10/1999 |

(Continued)

OTHER PUBLICATIONS

Australian Patent Examination Report No. 2 received in corresponding Australian Patent Application No. 2014297425 dated Oct. 24, 2016.

(Continued)

*Primary Examiner* — Mussa A Shaawat
*Assistant Examiner* — Abdhesh Jha
(74) *Attorney, Agent, or Firm* — Mattingly & Malur, PC

(57) ABSTRACT

A relative position calculating system for work machines includes a first dump truck (101) which receives a navigation signal from at least one of a plurality of satellites (120), a second dump truck (111) which receives a navigation signal from at least one of the plurality of satellites (120), and a relative position calculating apparatus (102) which calculates a relative position between the first dump truck (101) and the second dump truck (111) based on the navigation signals which the first dump truck (101) and the second dump truck (111) receive, respectively, from a common satellite of the plurality of satellites (121). Thus, an influence of a positioning error due to a satellite positioning system is reduced, and accuracy of a calculation for the relative position between the two dump trucks (101, 111) can be enhanced.

2 Claims, 8 Drawing Sheets

(56) References Cited

FOREIGN PATENT DOCUMENTS

| JP | 2000-304843 A | 11/2000 |
|---|---|---|
| JP | 2004-170268 A | 6/2004 |
| JP | 2007-164280 A | 6/2007 |
| JP | 2011-106870 A | 6/2011 |
| JP | 2011-221869 A | 11/2011 |

OTHER PUBLICATIONS

Oloufa, A. A. et al., "Situational Awareness of Construction Equipment Using GPS, Wireless and Web Technologies", Automation in Construction, Dec. 2003. pp. 737-748.

International Preliminary Report on Patentability received in corresponding International Application No. PCT/JP2014/069765 dated Feb. 11, 2016.

International Search Report of PCT/JP2014/069765.

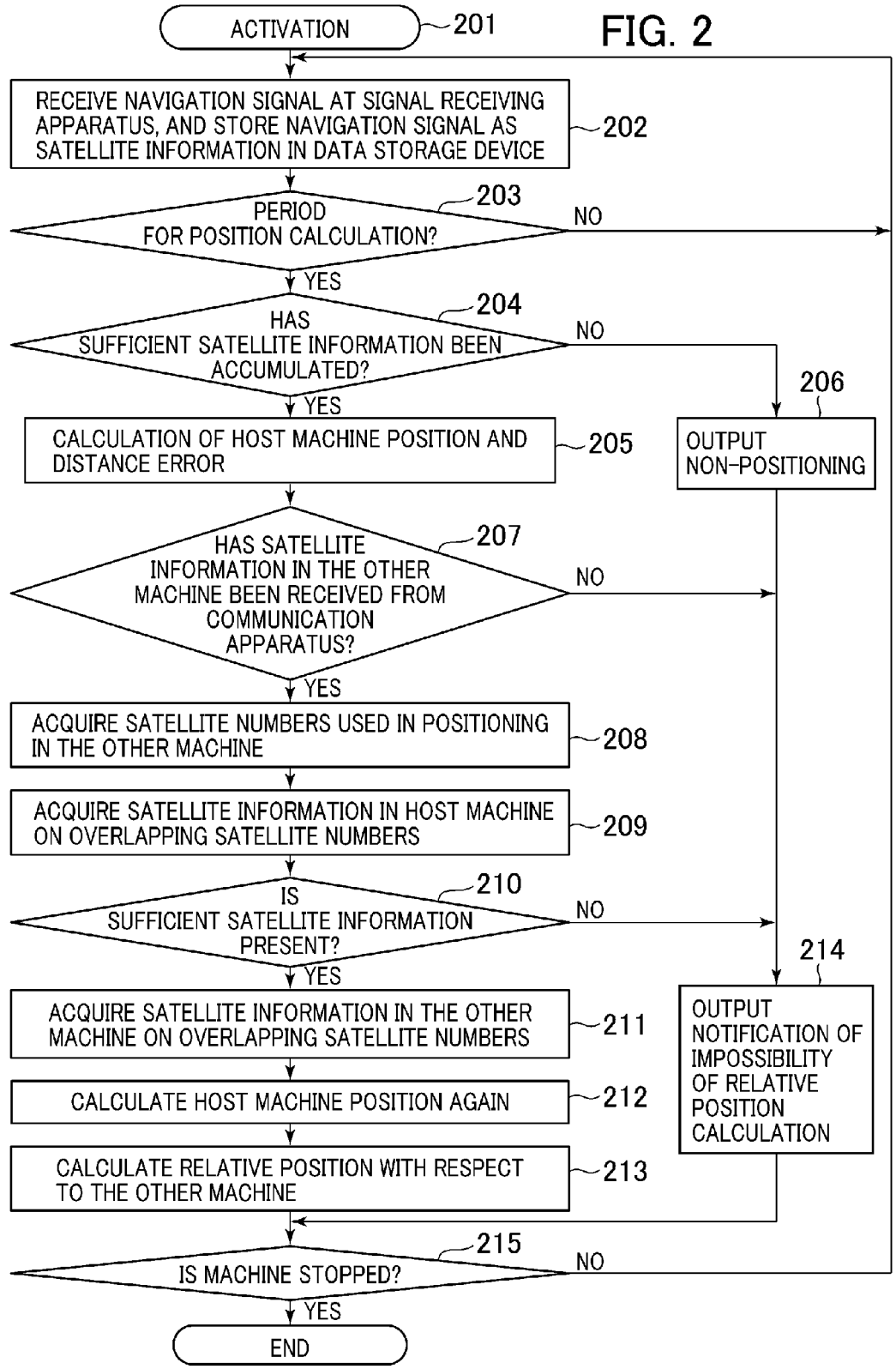

FIG. 3

| | | |
|---|---|---|
| 301 | TOTAL NUMBER OF INFORMATION | TOTAL NUMBER OF STORAGE OF ALL STORED INFORMATION |
| 302 | NUMBER OF HOST MACHINE INFORMATION | NUMBER OF STORAGE OF INFORMATION IN HOST MACHINE |
| 303 | TOTAL NUMBER OF SATELLITES | TOTAL NUMBER OF SATELLITES RELATED TO RECEPTION BY HOST MACHINE |
| 304 | SATELLITE NUMBER (i) | NUMBER (i) OF SATELLITE RELATED TO RECEPTION BY HOST MACHINE |
| 305 | DISTANCE (i) TO SATELLITE | DISTANCE TO SATELLITE CORRESPONDING TO SATELLITE NUMBER (i) |
| 306 | DISTANCE ERROR (i) | ERROR OF DISTANCE TO SATELLITE CORRESPONDING TO SATELLITE NUMBER (i) |
| 307 | SATELLITE POSITION (i) | POSITION OF SATELLITE CORRESPONDING TO SATELLITE NUMBER (i) |
| | ... | |
| 308 | RECEPTION TIME | TIME (UTC) AT WHICH HOST MACHINE RECEIVES NAVIGATION SIGNAL |
| 309 | NUMBER OF INFORMATION IN THE OTHER MACHINE | NUMBER OF STORAGE OF INFORMATION IN THE OTHER MACHINE |
| 310 | TOTAL NUMBER OF SATELLITES | TOTAL NUMBER OF SATELLITES WHICH THE OTHER MACHINE USES IN POSITIONING |
| 311 | SATELLITE NUMBER (j) | NUMBER (j) OF SATELLITE WHICH THE OTHER MACHINE USES IN POSITIONING |
| 312 | DISTANCE (j) TO SATELLITE | DISTANCE TO SATELLITE CORRESPONDING TO SATELLITE NUMBER (j) |
| 313 | ERROR (j) OF DISTANCE | ERROR OF DISTANCE TO SATELLITE CORRESPONDING TO SATELLITE NUMBER (j) |
| | ... | |
| 314 | POSITIONING TIME | TIME (UTC) AT WHICH THE OTHER MACHINE PERFORMS POSITIONING |
| 315 | MEASURED POSITION | POSITION MEASURED BY THE OTHER MACHINE |
| 316 | SPEED VECTOR | MOVEMENT SPEED VECTOR OF THE OTHER MACHINE |
| 317 | POSTURE VECTOR | POSTURE VECTOR OF THE OTHER MACHINE |
| 318 | GPS MOUNTING POSITION | DIFFERENCE OF GPS MOUNTING POSITION WITH RESPECT TO VEHICLE REFERENCE POSITION OF THE OTHER MACHINE |

FIG. 7

| | | |
|---|---|---|
| 301 | TOTAL NUMBER OF INFORMATION | TOTAL NUMBER OF STORAGE OF ALL STORED INFORMATION |
| 302 | NUMBER OF HOST MACHINE INFORMATION | NUMBER OF STORAGE OF INFORMATION IN HOST MACHINE |
| 303 | TOTAL NUMBER OF SATELLITES | TOTAL NUMBER OF SATELLITES RELATED TO RECEPTION BY HOST MACHINE |
| 304 | SATELLITE NUMBER (i) | NUMBER (i) OF SATELLITE RELATED TO RECEPTION BY HOST MACHINE |
| 305 | DISTANCE (i) TO SATELLITE | DISTANCE TO SATELLITE CORRESPONDING TO SATELLITE NUMBER (i) |
| 306 | DISTANCE ERROR (i) | ERROR OF DISTANCE TO SATELLITE CORRESPONDING TO SATELLITE NUMBER (i) |
| 307 | SATELLITE POSITION (i) | POSITION OF SATELLITE CORRESPONDING TO SATELLITE NUMBER (i) |
| | ... | |
| 308 | RECEPTION TIME | TIME (UTC) AT WHICH HOST MACHINE RECEIVES NAVIGATION SIGNAL |
| 309 | NUMBER OF INFORMATION IN THE OTHER MACHINE | NUMBER OF STORAGE OF INFORMATION IN THE OTHER MACHINE |
| 701 | TOTAL NUMBER OF SATELLITES | TOTAL NUMBER OF SATELLITES WHICH THE OTHER MACHINE USES IN POSITIONING |
| 702 | SATELLITE NUMBER (j) | NUMBER (j) OF SATELLITE WHICH THE OTHER MACHINE USES IN POSITIONING |
| 703 | DISTANCE (j) TO SATELLITE | DISTANCE TO SATELLITE CORRESPONDING TO SATELLITE NUMBER (j) |
| 704 | DISTANCE ERROR (j) | ERROR OF DISTANCE TO SATELLITE CORRESPONDING TO SATELLITE NUMBER (j) |
| 314 | POSITIONING TIME | TIME (UTC) AT WHICH THE OTHER MACHINE PERFORMS POSITIONING |
| 315 | MEASURED POSITION | POSITION MEASURED BY THE OTHER MACHINE |
| 705 | POSITIONING ERROR | ERROR OF POSITION POSITIONED BY THE OTHER MACHINE |
| 316 | SPEED VECTOR | MOVEMENT SPEED VECTOR OF THE OTHER MACHINE |
| 317 | POSTURE VECTOR | POSTURE VECTOR OF THE OTHER MACHINE |
| 318 | GPS MOUNTING POSITION | DIFFERENCE OF GPS MOUNTING POSITION WITH RESPECT TO VEHICLE REFERENCE POSITION OF THE OTHER MACHINE |

RELATIVE POSITION CALCULATING SYSTEM FOR WORK MACHINE

TECHNICAL FIELD

The present invention relates to a system for calculating a relative position between work machines including a dump truck operated in a mine.

BACKGROUND ART

A work machine including a dump truck operated in a mine is limited in traveling track thereof, and is forced to undergo passing and miss, and to approach other work machines including a hydraulic excavator. In particular, the work machine (mining machinery) utilized in the mine is large in size in many cases. Therefore, if the work machines bump each other when they approach each other, then, a big accident is caused in many cases, and thus a function of preventing a collision is strongly requested therefor. For collision prevention, it is necessary to know relative positions with respect to other machines, and thus a method of acquiring a relative position between a plurality of vehicles is disclosed in the prior art as well.

For example, in JP-2011-221869-A, there is disclosed a method with which a position (GPS position) where each vehicle measures individually by using a Global Positioning System (hereinafter referred to as a GPS) is communicated between two vehicles, thereby calculating a relative position between the two vehicles concerned. In addition, in JP-2007-164280-A, there is disclosed a method with which the GPS position measured by each machine is transmitted to a monitoring station, and is then distributed from the monitoring station to other machines. If these methods are used, then, the relative position between the vehicles can be calculated.

PRIOR ART DOCUMENTS

Patent Documents

Patent document 1: JP-2011-221869-A
Patent document 1: JP-2007-164280-A

SUMMARY OF THE INVENTION

Problem to be Solved by the Invention

However, the method of calculating the relative position by using the results obtained through the positioning carried out by the two vehicles independently using a Satellite Positioning System (GPS) as described above, involves the following problem. That is to say, positioning errors for the vehicles are contained in the relative position between them due to the influence of errors (positioning errors) contained in process of the positioning by the vehicles. As a result, the relative position cannot be measured with sufficient accuracy.

An object of the present invention is to provide a relative position calculating system which is capable of reducing an influence of a positioning error by the satellite positioning system as described above to enhance accuracy of calculation for a relative position between two work machines.

Means for Solving Problem

In order to attain the above object, the present invention includes: a first work machine which receives a navigation signal from at least one of a plurality of satellites; a second work machine which receives a navigation signal from at least one of the plurality of satellites; and a relative position calculating apparatus which calculates a relative position between the first work machine and the second work machine based on the navigation signals which the first work machine and the second work machine receive, respectively.

Effects of the Invention

According to the present invention, the accuracy of calculation for the relative position can be enhanced.

BRIEF DESCRIPTION OF THE DRAWINGS

FIG. 2 is a flow of relative position calculating processing according to the first embodiment of the present invention.

FIG. 3 is an example of a data set stored in a data storing device in the first embodiment of the present invention.

FIG. 7 is an example of a data set stored in a data storing device in the second embodiment of the present invention.

MODE FOR CARRYING OUT THE INVENTION

First Embodiment

Firstly, a first embodiment of the present invention will be described by using the drawings. A relative position calculating system for work machines according to the first embodiment calculates a relative position between a plurality of large dump trucks (mining dump trucks) which are mainly utilized in a mine as work machines. Thus, the relative position calculating system for work machines according to the first embodiment is an example when there is no mutual information before the relative position is calculated.

Figure 1:
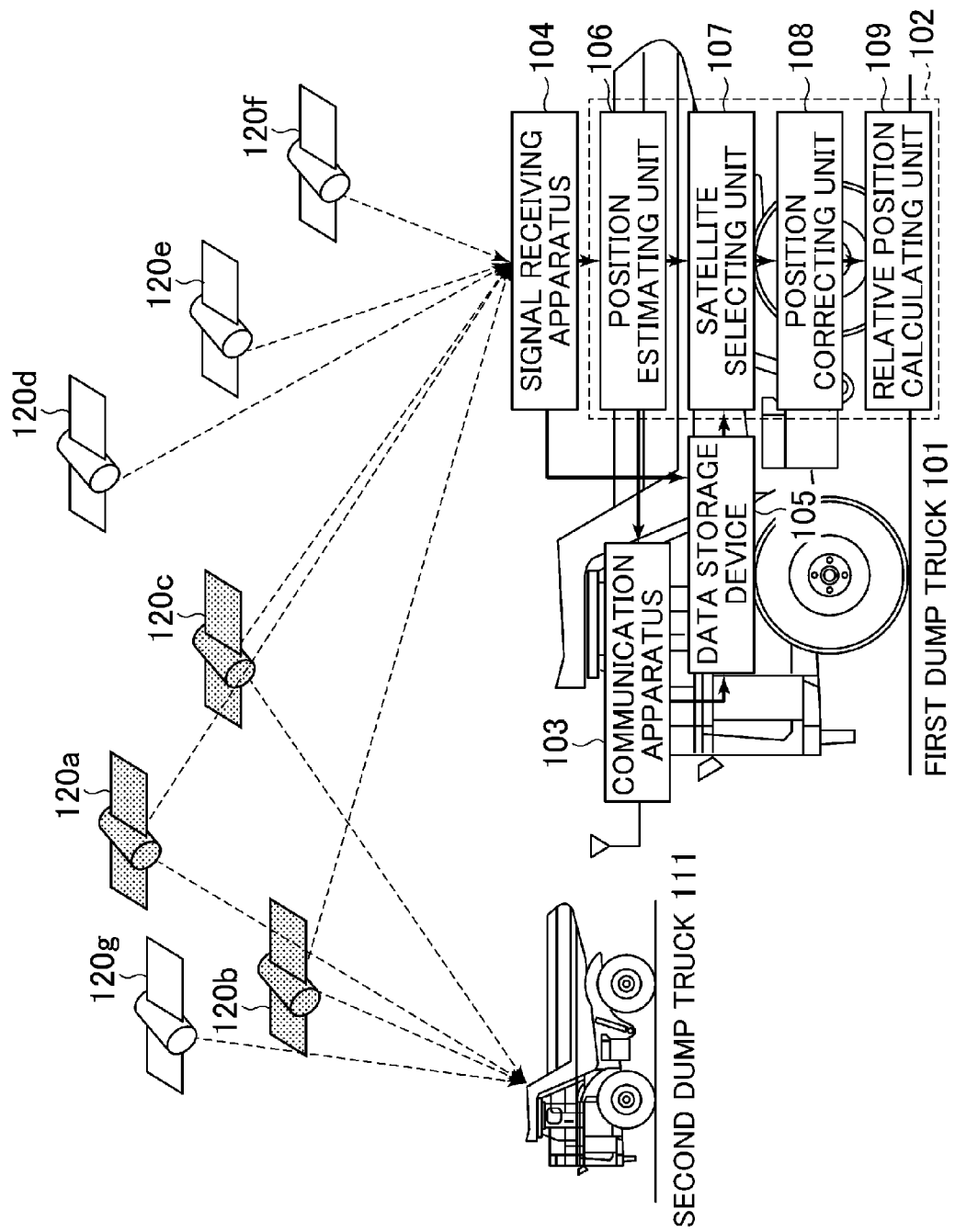
FIG. 1 is an example of a configuration of a relative position calculating system according to a first embodiment of the present invention.

An example of a configuration of the relative position calculating system according to the first embodiment of the present invention is shown in FIG. 1. A plurality of dump trucks 101, 111 included in the relative position calculating system shown in the figure receive navigation signals transmitted thereto from a plurality of GPS satellites 120 to calculate their host positions. Seven satellites 120a to 120g are shown as the GPS satellites 120 in FIG. 1. In a state shown in FIG. 1, of the seven satellites 120a to 120g concerned, the three satellites (satellites 120a, 120b, and 120c) are present as the satellites from which both the two dump trucks 101, 111 can receive the navigation signals.

It is noted that although only the two dump trucks 101, 111 are shown in FIG. 1, the number of dump trucks configuring this system may be three or more. In addition, although only the configuration of the dump truck 101 is shown in FIG. 1 for simplification, the dump truck 111 also shall include the same configuration. Moreover, although the system utilizing only the dump trucks 101, 111 as an example of the work machines is described in this case, the system may be configured by utilizing other work machines such as a hydraulic excavator and a wheel loader. Also, the system may be built by including these work machines in addition to the dump trucks.

In this case, the dump truck 101 is referred to as "a host machine" or "a first work machine" in some cases, and the dump truck 111 is referred to as "the other machine" or "a second work machine" in some cases. In addition, the plurality of dump trucks 101, 111 included in the system according to this embodiment is all managed on the basis of common time (for example, Coordinated Universal Time (UTC time)). Also, the relative distance between the dump trucks 101, 111 is sufficiently short compared with each of distances to the GPS satellites 120, and thus it shall be possible to assume that the dump trucks 101, 111 are present on the same plane.

In FIG. 1, each of the dump trucks 101, 111 includes a communication apparatus 103, a signal receiving apparatus (GPS receiving apparatus) 104, a data storing device 105, and a relative position calculating apparatus 102. In this case, the communication apparatus 103 serves to exchange information (for example, information contained in the navigation signal, and information (satellite information) calculated from the information concerned) with the other dump truck (for example, the dump truck 111), a computer of a control center (not shown), or the like through radio communication. The signal receiving apparatus 104 serves to receive the navigation signal (navigation signal) transmitted thereto from each of the GPS satellites 120. The data storing device 105 serves to store therein information on the GPS satellites 120, which is contained in the navigation signal and includes satellite numbers, time of transmission of the navigation signals, satellite orbit information, and satellite positions. Also, the relative position calculating apparatus 102 serves to calculate the relative position between the host machine and the other machine.

The relative position calculating apparatus 102 is constituted by a computer and includes a position estimating portion 106, a satellite selecting portion 107, a position correcting portion 108, and a relative position calculating portion 109. In this case, the position estimating portion 106 serves to calculate the position of the host machine based on the navigation signal acquired at the signal receiving apparatus 104. The satellite selecting portion 107 serves to narrow the navigation signal(s), which are to be actually used in positioning, of the navigation signals acquired at the signal receiving apparatus 104. The position correcting portion 108 serves to calculate anew the position of the host machine based on a correction value $L_{ci}$. Also, the relative position calculating portion 109 serves to measure the relative position between the host machine and the other dump truck. In FIG. 1, directions of arrows of line segments connecting between portions of the relative position calculating apparatus 102, and between each portions of the relative position calculating apparatus 102 and the communication apparatus 103 show flows of the data, respectively.

Next, a description will be given with respect to relative position calculating processing which is executed in the dump truck 101. FIG. 2 shows a flow of the relative position calculating processing. As shown in this figure, in Step 201, the relative position calculating apparatus 102 is activated, and the flow proceeds to Step 202. In this embodiment, the activation of the relative position calculating apparatus 102, the signal receiving apparatus 104, the data storing device 105, and the communication apparatus 103 is carried out synchronously with the activation of the damp truck 101.

Steps of Step 202 and Step 203 are processing which is executed within the signal receiving apparatus 104. In Step 202, the navigation signals transmitted from a plurality of GPS satellites 120 are received at the signal receiving apparatus 104, and are converted into the satellite signals which are in turn stored in the data storing device 105. Then, the flow proceeds to Step 203.

A number of the satellite (satellite number) which has outputted the navigation signal, information representing the position of the satellite concerned, and time ($t_s$) at which the navigation signal concerned has been outputted are contained in the navigation signal received in Step 202. Also, a distance r to the satellite can be obtained from Expression (1) which will be described below, based on the time ($t_s$) at which the navigation signal concerned has been outputted, and time ($t_r$) at which the navigation signal concerned has been received at the signal receiving apparatus 104.

$$r = c(t_r - t_s)|  \hspace{2cm} \text{Expression (1)}$$

where c is the speed of light.

Here, an example of a data set stored in the data storing device 105 of either the host machine 101 or the other machine 111 is shown in FIG. 3. The number of storage of all the number of information stored at the time concerned is stored as the total number 301 of information in the data storing device 105. The total number 301 of information is total of the number 302 of information in the host machine, and the number 309 of information in the other machine. Here, the number 302 of information in the host machine represents a total number of satellites 120 from which the host machine received the navigation signals. Also, the number 309 of information in the other machine represents a total number of satellites 120 from which the other machine received the navigation signals.

Moreover, there are stored the total number 303 of satellites, satellite numbers 304 of the satellites 120, a distances 305 to the satellites 120, errors 306 of the distances to the satellites 120, and positions (satellite positions) 307 of the satellites 120. In this case, the total number 303 of satellites represents the total number of satellites 120 from which the host machine received the navigation signal. The satellite numbers 304 of the satellites 120 represents the satellites 120 from which the host machine received the navigation signals. The distances 305 to the satellites 120 represent distances to the satellites 120 from which the host machine receives the navigation signals. The errors 306 of the distances to the satellites 120 represent errors of the distances to the satellites 120 from which the host machine received the navigation signals. Also, the positions (satellite positions) 307 of the satellites 120 represent positions of the satellites 120 from which the host machine receives the navigation signals.

In addition, time 308 at which the host machine received the navigation signal is stored in the form of the UTC time in the data storing device 105. In addition, as the information on the other machine, which was stored in the data storing device 105, for example, information 311, 312, and 313 on the satellite which the other machine was used in the positioning is stored, and the data thereon will be described later.

Of the data stored in the data storing device 105, the satellite numbers 304 and the satellite positions 307 are contained as information in the navigation signals from the satellites 120. The distance 305 (first satellite distance) can be calculated from Expression (1) described above based on the navigation signals from the satellites 120 and on the time 308. A description of the distance errors 306, and a method of manufacturing the same will be described later. It is noted that an initial value of the distance error 306 is zero, and is successively rewritten with a value which is calculated after position estimation in Step 205 will be described later.

In Step 203, it is judged whether or not a period is a position calculation period. When the period is the position calculation period, a message is transmitted to the position estimating portion 106, and the flow proceeds to Step 204. When the period is not the position calculation period, the flow returns back to Step 202. There is not especially a limit to the position calculation period. Thus, a lapse of predetermined time may be measured by a timer, or a message or the like which is received through the communication apparatus 103 may be used as a trigger.

Next, a description will be given with respect to Steps from 204 to 206. Steps from 204 to 206 are processing which is executed within the position estimating portion 106.

In Step 204, it is judged whether or not the satellite information stored in Step 202 has been sufficiently accumulated for the positioning. It is necessary for the estimation (positioning) of the position to receive the navigation signals from at least three or more satellites. For this reason, in Step 204 according to this embodiment, the judgment as to whether or not the sufficient satellite information for the positioning has been accumulated is carried out on the basis of the judgment as to whether or not the navigation signals have been able to be received from the three or more satellites 120. When it is judged in Step 204 that the accumulated satellite information has been sufficient, the flow proceeds to Step 205. When it is judged in Step 204 that the accumulated satellite information has been insufficient, the flow proceeds to Step 206.

In Step 205, the position of the host machine is calculated from the navigation signals received from the three or more satellites 120. The principle of triangulation is used for the calculation for the position in Step 205. For example, when the navigation signals from N satellites 120 in total can be received, where a position of the i-th (i=1, 2, . . . , N) satellite of the N satellites 120 is represented as (Xi, Yi, Zi), where a distance (first satellite distance) 305 to the i-th satellite calculated from the navigation signal received from the i-th satellite concerned is represented as ri, and where an error is represented as s, a position (x, y, z) of the host machine 101 can be estimated by solving an equation expressed by Expression (2) in a simultaneous style.

$$\begin{cases} r_1 = \sqrt{(X_1 - x)^2 + (Y_1 - y)^2 + (Z_1 - z)^2} + s \\ r_2 = \sqrt{(X_2 - x)^2 + (Y_2 - y)^2 + (Z_2 - z)^2} + s \\ \vdots \\ r_N = \sqrt{(X_N - x)^2 + (Y_N - y)^2 + (Z_N - z)^2} + s \end{cases} \quad \text{Expression (2)}$$

The maximum likelihood position estimation is carried out from the received signal(s) by using a probability model filter such as the Kalman filter in the position calculation in consideration of the position calculated from Expression (2) described above or the like, and of the error s of the position calculated.

Next, distances (second satellite distances) from the host machine 101 to the satellites 120 are calculated based on the host machine position estimated from the solution of Expression (2), and on the positions 307 of the satellites 120. Also, distance errors ϵ 306 are calculated from differences between the calculated distances and the distances (first satellite distances) 305 to the satellites calculated from the navigation signals from the satellites 120. That is to say, the host machine position obtained from Expression (2) is represented as (Px, Py, Pz), the position of the i-th satellite is represented as (Xi, Yi, Zi), and the distance (first satellite distance) 305 to the i-th satellite is represented as ri. At this time, the distance error ϵi 306 of the i-th satellite position is expressed by Expression (3):

$$\epsilon_i = |\sqrt{(X_i - P_x)^2 + (Y_i - P_y)^2 + (Z_i - P_z)^2} - r_i| \quad \text{Expression (3)}$$

The distance error ϵ 306 of the satellite position i calculated here is stored in the data storing device 105. Then, the distance error ϵ 306 of the satellite position i thus stored is transmitted together with the satellite information 303 to 307 stored in the data storing device 105 toward the other machine 111 through the communication apparatus 103. It is used that similarly, the processing of Steps 201, 202, 203, 204, 205, and 206 which was described above by using the host machine 101 is executed in the other machine 111 as well. Also, of the satellite information stored in the data storing device 105 of the other machine 111, the information on the satellite which the other machine 111 used in the positioning (the data which is stored as the satellite number 311, the satellite distance (third satellite distance) 312, and the distance error 313 in the data storing device 105 shown in FIG. 3) is transmitted toward the communication apparatus 103 of the host machine 101 through the communication apparatus 103 of the other machine 111. It is noted that as shown in FIG. 3, the number 309 of information in the other machine, the total number 310 of satellites, the satellite numbers 311, the distances 312 to the satellites 312, and the distance errors 313 are stored in the data storing device 105 of the other machine 111.

After completion of the transmission of the satellite information 303 to 307 to the other machine 111, the position estimating portion 106 of the host machine 101 sends a completion message to the satellite selecting portion 107, and the flow proceeds to Step 207.

On the other hand, when it is judged in Step 204 that the sufficient satellite information for the positioning has not yet been accumulated, the positioning of the host machine 101 cannot be carried out. Therefore, the result of the un-positioning of the position is outputted in Step 206, and a message is sent to the relative position calculating portion 109. Then, the flow proceeds to Step 214.

Next, a description will be given with respect to Steps from 207 to 209. Steps from 207 to 209 are processing in the satellite selecting portion 107.

In Step 207, it is judged whether or not the satellite information on the satellite(s) which the other machine 111 used in the positioning has been received from the communication apparatus 103. When the satellite information has been received from the communication apparatus 103, the flow proceeds to Step 208. When the satellite information has not yet been received from the communication apparatus 103, a message on the satellite selection disability is set to the relative position calculating portion 109. Then, the flow proceeds to Step 214.

The communication apparatus 103 of the host machine 101 passively waits for the communication from the other machine 111, and the data received through the communication apparatus 103 is stored in the data storing device 105. The numbers 311 of the three or more satellites which the other machine 111 received the navigation signals to use in the positioning, the distance 312 to the three or more satellites 120 concerned, and the distance errors 313 thereof are contained in the data in the other machine 111 which the host machine 101 receives through the communication apparatus 103. These pieces of data are present by the number of satellites which the other machine 111 has used in the positioning. In the host machine 101, of these pieces of data 311, 312, and 313, only the data which the other machine 111 has utilized/calculated in one positioning (set as one set) shall be stored in the data storing device 105. When in the subsequent positioning, the new pieces of data 311, 312, and 313 which the other machine 111 has utilized/calculated are transmitted, the pieces of old data are deleted, and the pieces of new data concerned are stored in the data storing device 105. That is to say, the segments of data 311, 312, and 313 in the other machine 111 of the data storing device 105 are rewritten every one set.

In addition, time (which may be time at which the navigation signal(s) is(are) received) 314, a speed vector 316 and a posture vector 317, and a difference of mounting position of the signal receiving apparatus (GPS receiver) 104 with respect to vehicle reference position of the other machine 111, that is, GPS mounting position 318, are further contained in the data in the other machine 111, which the host machine 101 receives through the communication apparatus 103. In this case, the time 314 is time at which the positioning is carried out based on the navigation signal(s) received at the other machine 111. The speed vector 316 and the posture vector 317 are vectors of the other machine 111 which are simultaneously calculated at the time of the time of the positioning concerned.

In Step 208, the satellite selecting portion 107 reads out all the satellite numbers 311 which the other machine 111 used in the positioning from the data storing device 105, and sends a message of completion of the satellite selection to the position correcting portion 108. Then, the flow proceeds to Step 209.

In Step 209, the satellite number 311 which is read out in Step 208 and has been used by the other machine 111 in the positioning is compared with the satellite number 304 which the host machine 101 received. As a result of comparison, the segments of data 305, 306, and 307 (the satellite distances 305, the distance errors 306, and the satellite positions 307), in the host machine 101, on the satellite numbers which overlap each other between the host machine 101 and the other machine 111 are read out. Then, the flow proceeds to Step 210. Specifically, in Step 209, the pieces of data on the common satellites from which of a plurality of satellites 120, both the host machine 101 and the other machine 111 can receive the navigation signals, and which has been utilized in the positioning of themselves, respectively: the distances 305 from the host machine 101 to the common satellites; the distance errors 306 thereof; and the positions 307 of the common satellites are read out. For example, in the example of FIG. 1, the pieces of data 305, 306, and 307 on the three satellites 120a, 120b, and 120c are read out.

Next, a description will be given with respect to Steps from 210 to 212. Steps from 210 to 212 are processing in the position correcting portion 108.

In Step 210, the position correcting portion 108 judges whether or not the satellite distances 305, the distance errors 306, and the satellite positions 307 which have been acquired in Step 209 are enough to carry out the re-positioning, of the host machine 101, related to Step 212 which will be described later. Whether or not the data sets are enough to carry out the re-positioning is judged on the basis of whether or not the data sets from the three or more satellites 120 have been able to be acquired, similarly to Step 204. That is to say, if three or more numbers of satellites which overlap one another in Step 209 are present, then, it is judged that the data sets are enough to carry out the re-positioning. Here, when the data sets are enough to carry out the re-positioning, the flow proceeds to Step 211. Alternatively, when the data sets are not enough to carry out the re-positioning, a message is sent to the relative position calculating portion 109. Then, the flow proceeds to Step 214.

In Step 211, the position correcting portion 108 acquires the distances 312 and the distance errors 313 in the other machine about the satellite numbers which overlap one another in Step 209 in addition to the satellite distances 305, the distance errors 306, and the satellite positions 307 which have been acquired in Step 209. Then, the flow proceeds to Step 212.

In Step 212, a correction value Lci is calculated based on the information acquired in Step 209 and Step 211, and the position of the host machine 101 is calculated anew (the re-processing of the host machine 101). Here, a flow of processing for re-calculating the position of the host machine 101 by using the satellite information in the other machine 111 will be described in more detail with reference to FIG. 4.

Figure 4:
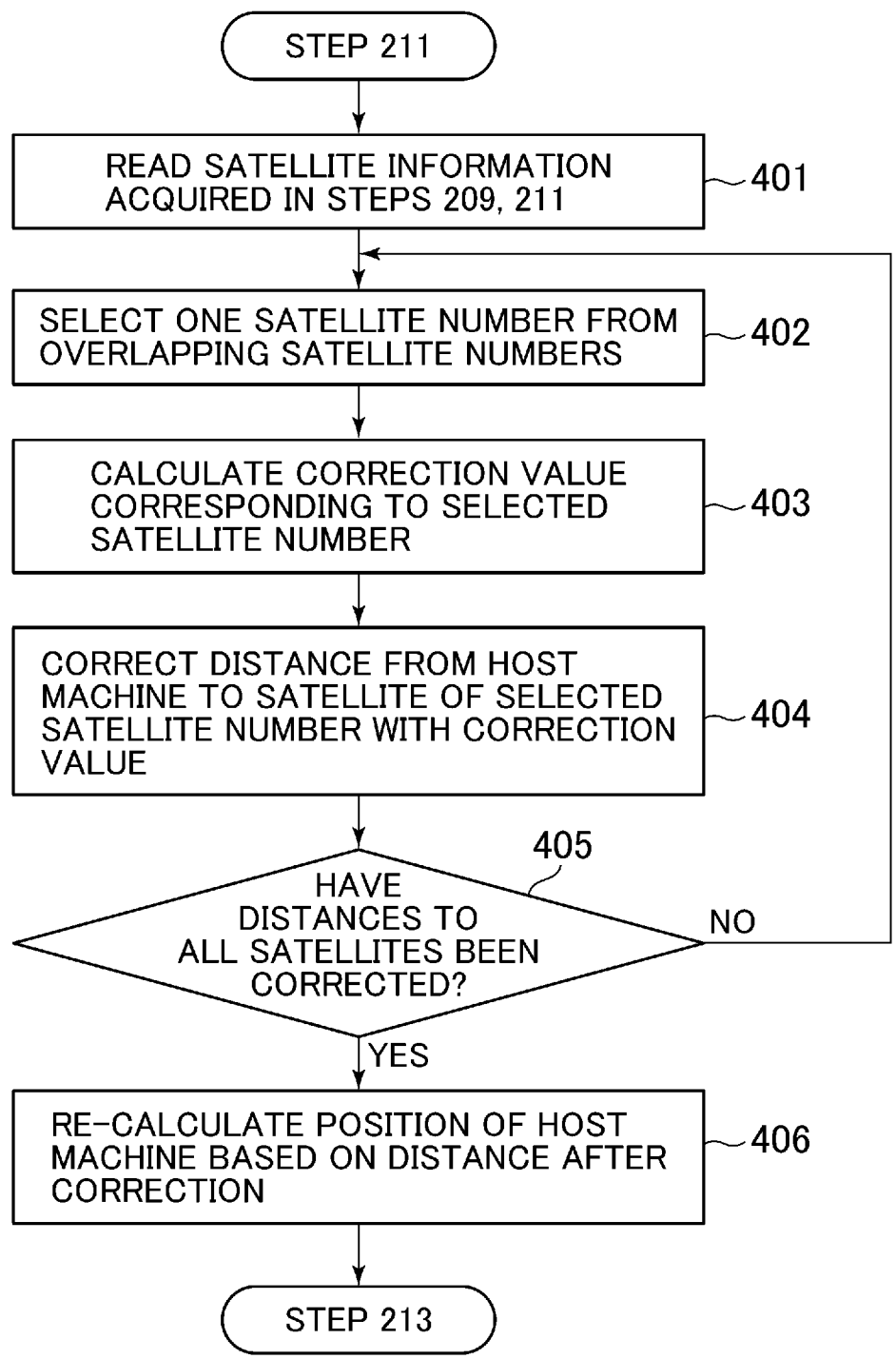
FIG. 4 is a flow of processing for re-calculating a position of a host machine using satellite information in the other machine.

In FIG. 4, in Step 401, the pieces of satellite information necessary for the re-positioning are all acquired, and the flow proceeds to Step 402. The pieces of satellite information which are acquired here are the satellite information on the satellite numbers which overlap between the other machine 111 and the host machine 101 and which has been acquired in Step 209 and Step 211 (specifically, the distances 305 from the host machine 101 to the satellites, the distance errors 306 and the satellite positions 307, and the distances 312 from the other machine 111 to the satellites 312 and the distance errors 313).

In Step 402, one satellite number i is selected from the satellite numbers, of the n satellites, which have been acquired in Step 401, and the flow proceeds to Step 403 (i=1, 2, . . . , n (however, n is more than 3)).

In Step 403, the position correcting portion 108 calculates the correction value Lci, which is utilized for correction for the distances ri 305 from the host machine 101 to the satellite having the satellite number i allocated thereto, from the distance errors 306, 313 about the satellites for the n satellites and from the distance errors 306, 313 about the satellite having the satellite number i allocated thereto selected in Step 402. The correction value Lci is calculated using Expression (4) which will be described below based on an error $\epsilon_{ai}$ 313 of the distance to the satellite i which the other machine 111 calculates, an error $\epsilon_{ai}$ 306 of the distance to the satellite i which the host machine 101 calculates, and the total number, n, of satellites from which the host machine 101 and the other machine 111 receive the navigation signals in common. In Expression (4) which will be described below, the correction values Lci for the distances ri 305 from the host machine 101 to the n satellites 120 are calculated with the distances from the other machine 111 to the n satellites 120 as the reference. After completion of the calculation for the correction values Lci, the flow proceeds to Step 404. It is noted that when the correction value with the host machine 101 as the reference is intended to be calculated, it is only necessary that in Expression (4), the distance error $\epsilon_{ai}$ is replaced with the distance error $\epsilon_{si}$, and the distance error $\epsilon_{si}$ is replaced with the distance error $\epsilon_{ai}$, and under this condition, the calculation is carried out.

$$L_{ci} = \frac{\sum_{i}^{n}(\varepsilon_{si} - \varepsilon_{ai})}{n} - \varepsilon_{si}$$ Expression (4)

In Step 404, the distance is corrected by subtracting the correction value Lci acquired in Step 403 from the distance 305ri from the satellite having the satellite number i allocated thereto selected in Step 402 to the host machine 101. As a result, the distance from the satellite having the satellite number i allocated thereto to the host machine 101 is corrected with the distance from the satellite having the satellite number i allocated thereto to the other machine 111 as the reference. After completion of the correction for the distance from the satellite having the satellite number i allocated thereto to the host machine 101, the flow proceeds to Step 405. In this case, a distance after the correction is represented as rmi (i=1, 2, . . . , n (however, n is more than 3)).

In Step 405, it is confirmed whether or not Steps from 402 to 404 have been processed with respect to all the satellite numbers acquired in Step 401. When the processing for correcting the distance to the satellites having all the satellite numbers allocated thereto has been completed, the flow proceeds to Step 406. When the processing for correcting the distance to the satellites having all the satellite numbers allocated thereto has not yet been completed, the three pieces of processing from Step 402 to Step 404 are repetitively executed.

In Step 406, the positioning of the host machine 101 is carried out again by using the distances rmi after the correction obtained in the five pieces of processing from Step 401 to Step 405. The calculation for the positioning of the host machine 101 is carried out as follows. When the satellite information obtained in Step 401 is for the N satellites, the position of the i-th satellite (i=1, 2, . . . , N (however, N is more than 3)) is represented as (Xi, Yi, Zi), and the distance to the i-th satellite corrected based on the information acquired from the other machine 111 is represented as rmi. In this case, the position (x, y, z) of the host machine 101 after the correction can be calculated by solving an equation expressed by Expression (5) which will be described later in a simultaneous style. After completion of the re-calculation of the position of the host machine 101, the result of the re-calculation is outputted. Then, the flow proceeds to Step 213.

$$\begin{cases} r_{m1} = \sqrt{(X_1 - x)^2 + (Y_1 - y)^2 + (Z_1 - z)^2} + s \\ r_{m2} = \sqrt{(X_2 - x)^2 + (Y_2 - y)^2 + (Z_2 - z)^2} + s \\ \vdots \\ r_{mN} = \sqrt{(X_N - x)^2 + (Y_N - y)^2 + (Z_N - z)^2} + s \end{cases}$$ Expression (5)

Referring back to FIG. 2, in Step 213, the relative position calculating portion 109 calculates the relative position between the host machine 101 and the other machine 111 based on the position of the host machine 101 which was calculated anew in Step 212, and on the position 315 of the other machine 111. Here, an example of a flow of processing for calculating the relative position, which is to be executed in Step 213 will be described in more detail with reference to FIG. 5. In an example of FIG. 5, the relative position between the host machine 101 and the other machine 111 is calculated on the basis of the position of the host machine 101 calculated anew in Step 212, reception time 308 in the host machine 101 acquired from the data storing device 105, positioning time 314 in the other machine 111, the measured position 315, the speed vector 316, the posture vector 317, and the GPS mounting position 318.

Figure 5:
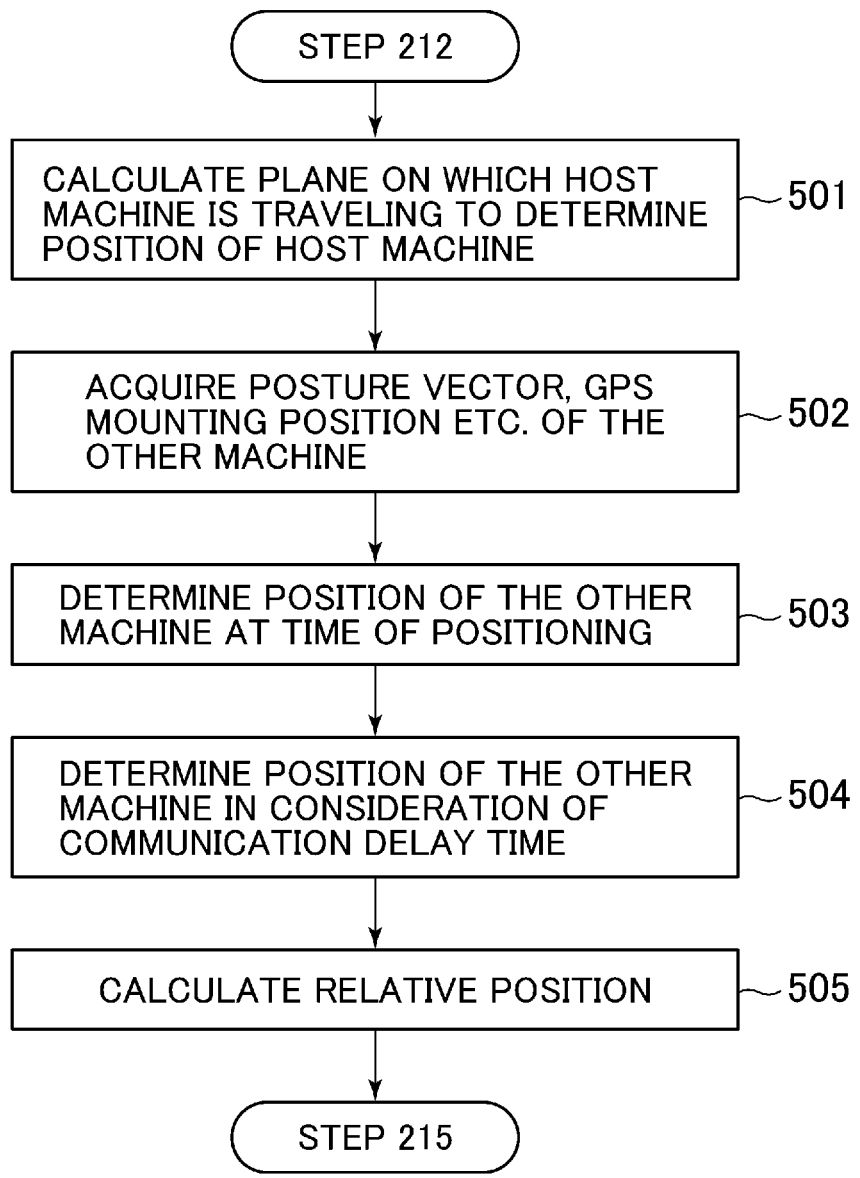
FIG. 5 is a flow of processing for calculating a relative position.

In FIG. 5, after completion of Step 212, in Step 501, the relative position calculating portion 109 estimates a plane, on which the host machine 101 is traveling, from the known mounting position (GPS position) where the signal receiving apparatus (GPS receiver) 104 of the host machine 101 is mounted. Also, the relative position calculating portion 109 sets a point at which the position of the host machine 101 re-calculated in Step 212 is projected onto the plane concerned as a new position of the host machine 101.

Next, in Step 502, the measured position 315 of the other machine 111, the positioning time 314, the speed vector 316, the posture vector 317, and the GPS mounting position 318 are acquired from the data storing device 105. Then, the flow proceeds to Step 503.

In Step 503, the vector is extended in a direction of the posture vector 317 with the measured position 315 of the other machine 111 acquired in Step 502 as a starting point. Also, a point at which the vector concerned crosses the plane in Step 501 is set as a position of the other machine 111 on the plane.

Next, in Step 504, a communication delay time is obtained from a difference between the reception time 308 in the host machine 101, and the reception time 314 in the other machine 111. In this case, the reception time 308 and the reception time 314 are stored in the data storing device 105. The movement direction and the movement distance of the other machine 111 during the delay time are calculated from the delay time and from the speed vector 316 of the other machine 111. Also, the movement direction on the plane in Step 501 is added to the position of the other machine 111 on the plane calculated in Step 502. As a result, the position of the other machine 111 at the reception time 308 in the host machine 101 can be estimated. It is noted that although in this case, the position of the other machine 111 is calculated by utilizing the time 314 of the positioning of the other machine 111, as described above, the time of the reception of the navigation signal in the other machine 111 may be utilized instead of utilizing the positioning time 314.

Next, in Step 505, the relative position between the host machine 101 and the other machine 111 is calculated by obtaining a difference between the position of the host machine 101 on the plane calculated in Step 502, and the position of the other machine 111 on the plane calculated in Step 504. After completion of the calculation for the relative position, the flow proceeds to Step 215.

Now, Step 214 is the processing which is executed when the relative distance cannot be calculated based on the judgment in any of Step 204, Step 207, and Step 210. Thus, the relative position calculating portion 109 outputs a notification that the relative position cannot be calculated. Then, the flow proceeds to Step 215.

In Step 215, it is judged whether or not the host machine 101 is stopped. When the host machine 101 is stopped, the processing in the relative position calculating apparatus 102 is ended. Alternatively, when the host machine 101 is not stopped, the flow returns back to Step 202, and the processing in and after Step 202 is repetitively executed.

As with the technique in the prior art described at the beginning, in the case of the method with which the difference between the GPS positions individually measured in the host machine and the other machine is obtained to calculate the relative position between both the host machine and the other machine, the errors resulting from all the GPS satellites used in the positioning of both the host machine and the other machine, and the error resulting from the GPS receiver are added to the relative position. In contrast, according to this embodiment constituted as described above, the common navigation satellite(s) (GPS satellite(s)) is(are) used by the host machine and the other machine, thereby correcting the errors resulting from the satellites. Therefore, compared with the prior method, the relative position between the host machine and the other machine can be calculated with higher accuracy.

It is noted that although in the embodiment described above, the relative position is calculated on the basis of the navigation signals from the satellites which are used in the positioning in the host machine and the other machine, respectively (for example, refer to FIG. 4), the relative position may be calculated on the basis of the navigation signal(s) from the satellite(s) from which both the host machine and the other machine can receive the navigation signal(s). That is to say, if the reception can be carried out by both the host machine and the other machine, then, the navigation signal(s) which is(are) not utilized in the positioning may be utilized.

Now, in the embodiment described above, the distance 312 and the distance error 313 of the other machine 111 which are utilized at the time of calculation for the relative position are only ones related to the satellite(s) used in the positioning of the other machine 111 (refer to Steps 208, 209). However, the distance 312 and the distance error 313 related to the satellite(s) from which the satellite signal(s) could be received, but which has not been utilized in the actual positioning of the other machine 111 may be utilized in the calculation of the relative position. When the relative position is calculated in such a manner, the transfer amount of data from the other machine 111 to the host machine 101, and the calculation amount following the calculation for the relative position are increased. However, the possibility that the sufficient satellite information is present in Step 210 of FIG. 2 can be greatly increased. As a result, the opportunity that the relative position becomes unable to be calculated can be largely reduced.

In addition, in the embodiment described above, as shown in Step 403 and Expression (4), the distance from the host machine 101 to the other satellite 120 is corrected as the distance from the other machine 111 to the other satellite 120 with the correction value Lci. However, the correction value may be calculated with any of the distance from the other machine and the distance from the host machine as the reference. With respect to which of the host machine 101 and the other machine 111 should be set as the reference for calculation for the correction value, there is the case where one which is better in visibility of the satellites 120 (that is, of the host machine 101 and the other machine 111, one in which the difference between the distance 305(312) and the distance error 306(313) is smaller) is set as the reference for selection. When the correction value is calculated with one which is better in the visibility of the satellites as the reference, the accuracy of the relative position can be enhanced compared with the case where the other is set as the reference.

A second embodiment of the present invention in which the satellite information on all the satellites from which the other machine 111 can receive the navigation signals is received by the host machine 101, and the work machine for which the reference is set for the correction value depending on the visibility of the satellites 120 is changed to calculate the relative position, based on the two points described above, will be described hereinafter.

Figure 6:
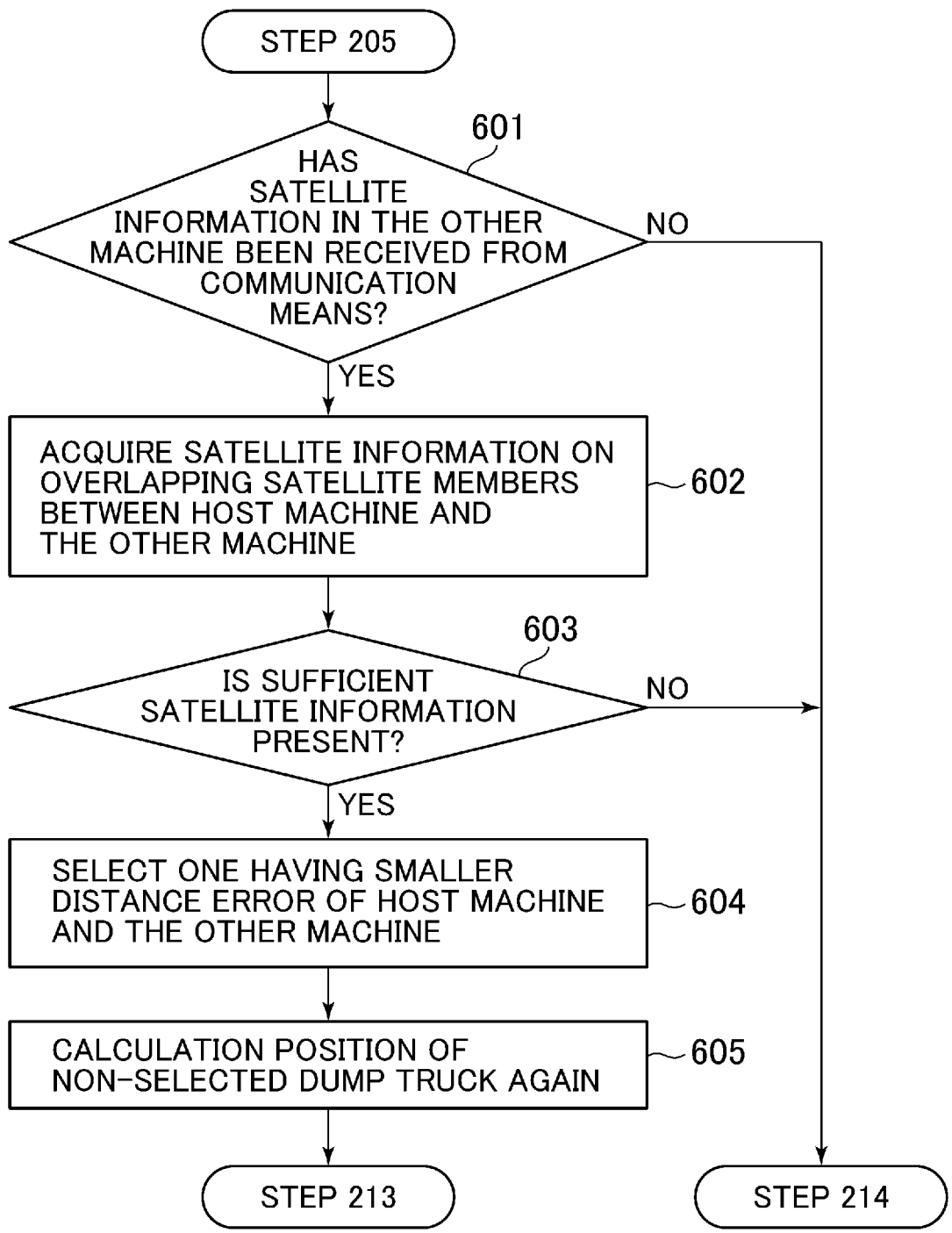
FIG. 6 is a chart showing a part of relative position calculating processing according to a second embodiment of the present invention by extracting the same.

A basic configuration of a relative position calculating system according to the second embodiment of the present invention is the same as that shown in FIG. 1, and thus an illustration thereof is omitted. In addition, although a relative position calculating processing flow of the second embodiment is different in Steps from 207 to 212 from that shown in FIG. 2. However, other Steps are the same as those shown in FIG. 2, and thus a description of the same Steps is omitted. FIG. 6 is a figure in which of the processing in the relative position calculating apparatus according to the second embodiment of the present invention, only changed portions (portions with which Steps from 207 to 212 of FIG. 2 are replaced) are extracted to be shown.

A series of processing from Step 201 to Step 205 shown in FIG. 2 is executed. When the satellite selecting portion 107 has received a message of completion of the processing from the position estimating portion 106 in Step 205, the processing shown in FIG. 6 is started. Steps from 601 to 602 are the processing in the satellite selecting portion 107.

When the processing of FIG. 6 is started, the satellite selecting portion 107 judges in Step 601 whether or not the satellite information on all the satellites from which the other machine 111 has received the navigation signals from the communication apparatus 103. In the case of the reception, the flow proceeds to Step 602. Alternatively, in the case of the non-reception, the satellite selecting portion 107 sends a message of impossibility of the satellite selection to the relative position calculating portion 109. Then, the flow proceeds to Step 214 (refer to FIG. 2).

The communication apparatus 103 passively waits for the communication. Thus, the pieces of data in the other machine which the host machine 101 receives through the communication apparatus 103 are all stored in the data storing device 105. FIG. 7 is a diagram showing an example of a data set stored in the data storing device 105 of the host machine 101 in the second embodiment of the present invention.

In FIG. 7, the total number 701 of satellites is the total number of satellites from which the other machine 111 receives the navigation signals, satellite numbers 702 are numbers of all the satellites from which the other machine 111 receives the navigation signals. Distances 703 to the satellites are distances from the other satellites to all the satellites from which the other machine 111 receives the navigation signals. Also, distance errors 704 are errors of the distances from the other satellites to all the satellites from which the other machine 111 receives the navigation signals. In addition, a positioning error 705 when the other machine 111 carries out the positioning is also stored in the data storing device 105. Since the received and stored data other than those described above are the same as the data in the data set shown in FIG. 3, a description thereof is omitted. It is noted that the data for which the host machine and the other machine are replaced with each other in FIG. 7 is stored in the data storing device 105 of the other machine 111.

In addition, for convenience, similarly to the first embodiment, of the data received through the communication apparatus 103, the total number 701 of satellites, the satellite numbers 702, the distances 703 to the satellites, the distance errors 704, and the positioning errors 705 shall be accumulated by one set. Also, the data in the data storing device 105 shall be rewritten every one set.

In Step 602, the satellite selecting portion 107 reads out the satellite numbers 702 of all the satellites from which the other machine 111 has received the navigation signals from the data storing device 105. Also, the satellite selecting portion 107 compares the satellite numbers 702 concerned, and the satellite number(s) 304 which the host machine 101 has received with each other. Then, the satellite selecting portion 107 reads out the data which overlap one another between the satellite numbers 702 and the satellite number 304, that is, the data 305, 306, and 307 (the satellite distances 305, the distance errors 306, and the satellite positions 307), in the host machine 101, on the satellite numbers, and the data 703, 704 (the satellite distances 703, and the distance errors 704), in the other machine 111, on the satellite numbers. The satellite selecting portion 107 sends a message of completion of the satellite selection to the position correcting portion 108. Then, the flow proceeds to Step 603.

Steps from 603 to 606 are the processing in the position correcting portion 108. In Step 603, it is judged whether or not the information acquired in Step 602 is enough to carry out the positioning based on whether or not three or more numbers of the satellites overlapping one another in Step 602 are present. Here, when the information acquired in Step 602 is enough to carry out the positioning, the flow proceeds to Step 604. When the information acquired in Step 602 is not enough to carry out the positioning, the flow proceeds to Step 214.

In Step 604, there is executed the processing for selecting one which is better in visibility of the satellites having the satellite numbers allocated thereto overlapping one another in Step 602, from the host machine 101 and the other machine 111. Specifically, the distance errors 306 in the host machine 101 calculated in Step 205, and the distance errors 704 in the other machine 111 stored in the data storing device 105 are compared with each other. As a result of the comparison, one having the distance errors smaller than those in the other is selected as the machine which is better in visibility of the satellites.

In Step 605, the correction value Lci is calculated with the dump truck which has been selected in Step 604 (hereinafter referred to as the selected dump truck in some cases) as the reference. Also, the position of the dump truck which has not been selected in Step 604 (hereinafter referred to as the non-selected dump truck in some cases) is re-calculated by using the correction value Lci. The calculation of the correction value Lci in Step 605, and the positioning calculation utilizing the correction value Lci are carried out similarly to the processing flow described above in FIG. 4. In this case, however, these pieces of calculation will be described with reference to FIG. 8.

Figure 8:
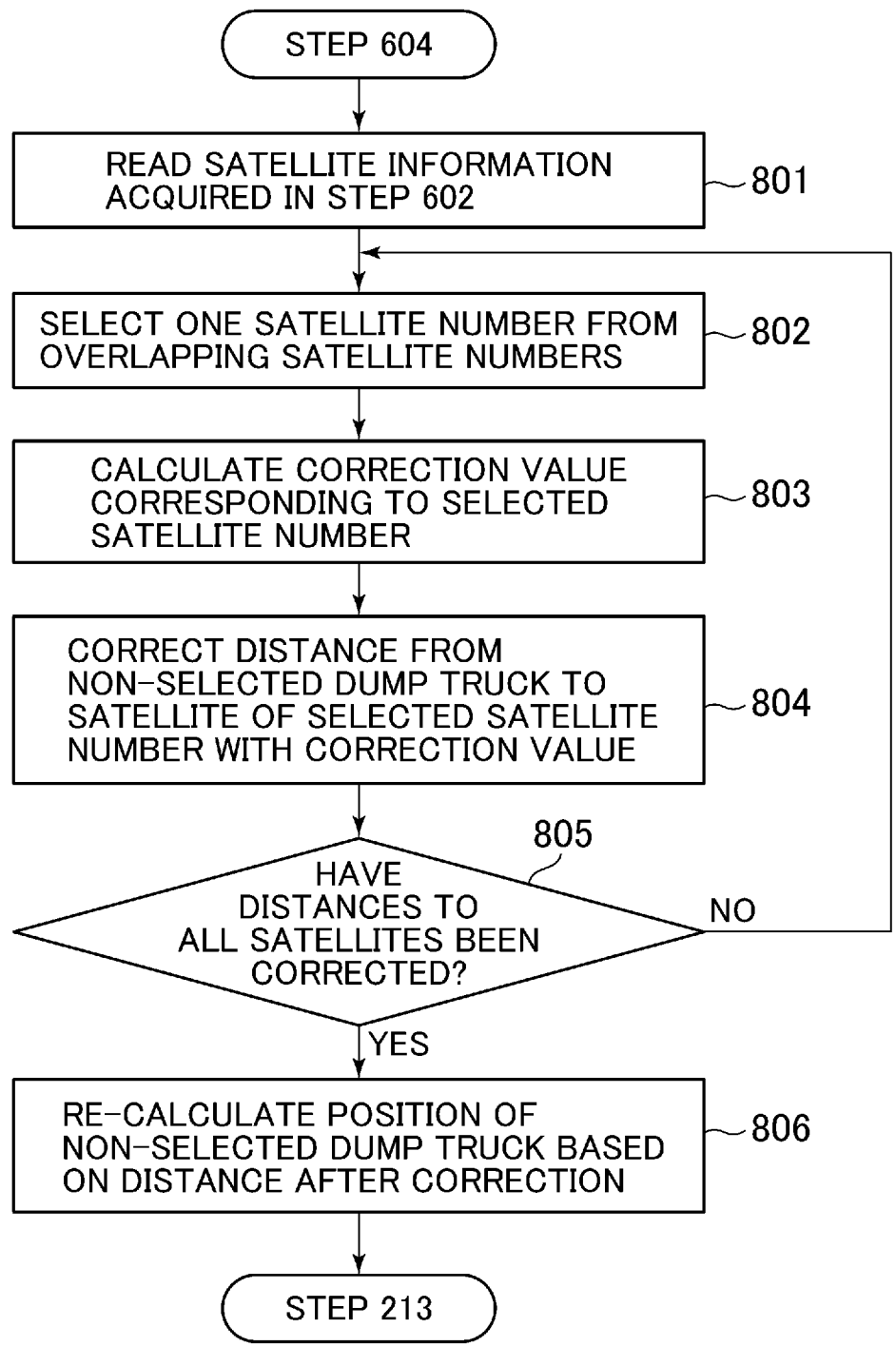
FIG. 8 is a flow of processing for re-calculating a position of a non-selected work machine in the second embodiment of the present invention.

In FIG. 8, in Step 801, all the pieces of satellite information necessary for the re-positioning are acquired. Then, the flow proceeds to Step 802. The satellite information which is acquired here is the satellite information on the satellite numbers overlapping one another, between the other machine 111 and the host machine 101, which was acquired in Step 602.

In Step 802, one satellite number i is selected among the satellite numbers, of the n satellites, which has been acquired in Step 801. Then, the flow proceeds to Step 803 (i=1, 2, ..., n (however, n is more than 3)).

In Step 803, the position correcting portion 108 calculates the correction value Lci, which is utilized for the correction for the distance ri from the dump truck selected in Step 604 to the satellite having the satellite number i allocated thereto, from the distance errors 306, 704 about the n satellites and from the distance errors 306, 704 about the satellite having the satellite number i allocated thereto selected in Step 802.

The correction value Lci is calculated from Expression (4) described above based on the error $\epsilon_{ai}$ of the distance from the selected dump truck to the satellite number i, the error $\epsilon_{si}$ of the distance from the non-selected dump truck to the satellite i, and the total number n of satellites from which the host machine 101 and the other machine 111 receive the navigation signals in common. In this case, the correction values Lci for the distances ri from the non-selected dump truck to the n satellites 120 are calculated with the selected dump truck as the reference from Expression (4) described above. After completion of the calculation for the correction values Lci, the flow proceeds to Step 804.

In Step 804, the correction value Lci acquired in Step 803 is subtracted from the distance ri from the satellite having the satellite number i allocated thereto selected in Step 802 to the non-selected dump truck, thereby correcting the distance concerned. Then, the flow proceeds to Step 805. In this case, a distance after the correction is represented as rmi (i=1, 2, ..., n (however, n is more than 3)).

In Step 805, it is confirmed whether or not Steps from 802 to 804 have been processed with respect to all the satellite numbers acquired in Step 801. When the processing for correcting the distances to the satellites having all the satellite numbers allocated thereto has been completed, the flow proceeds to Step 806. When the processing for correcting the distances to the satellites having all the satellite numbers allocated thereto has not yet been completed, the flow returns back to Step 802. Then, the processing from Step 802 to Step 804 is repetitively executed.

In Step 806, the positioning of the non-selected dump truck is carried out again by using the distance rmi, after the correction, which has been obtained in the processing from Step 801 to Step 805. The positioning of the non-selected dump truck is calculated as follows. The satellite information obtained in Step 801 is for the N satellites, the position of the i-th (i=1, 2, ..., N (however, N is more than 3)) satellites is expressed as (Xi, Yi, Zi), and the distance to the i-th satellite which has been corrected with the information acquired from the selected dump is represented as rmi. At this time, the position (x, y, z) of the non-selected dump truck after the correction can be calculated by solving the equation expressed by Expression (5) described above in the simultaneous style. After completion of the re-calculation for the position of the non-selected dump, the result of the re-calculation is outputted. Then, the flow proceeds to Step 213.

In Step 213, the relative position calculating portion 109 calculates the relative position between the host machine 101 and the other machine 111 based on the position of the non-selected dump which has been calculated anew in Step 605, and the position of the non-selected dump truck within the data storing device 105. For the concrete processing of Step 213, it is only necessary that in the description of FIG. 5 in the first embodiment, "the host machine" is changed with "the non-selected dump truck", and "the other machine" is changed with "the selected dump truck". Therefore, a description thereof is omitted here.

With this embodiment as well constituted in such a way, the common navigation satellite(s) is(are) used by the host machine and the other machine, thereby correcting the errors resulting from the satellites. Therefore, compared with the prior method, the relative position between the host machine and the other machine can be calculated with higher accuracy.

Now, although in the embodiment described above, the example of the dump truck is given as the work machine, the kind of work machine to which the present invention can be applied is by no means limited to the dump truck. For example, the present invention can also be applied to the work machine as long as the work machine is self-propelled one such as the hydraulic excavator or the wheel loader to which the receiving apparatus capable of receiving the navigation signal(s) from the navigation satellite(s) can be mounted.

In addition, although in the embodiment described above, the description has been given with respect to the case where the relative position calculating apparatus 102 is mounted to the dump truck as the work machine, there is not a limit to the installation position thereof. For example, a configuration may also be adopted such that the relative position calculating apparatus 102 is installed within the building of the control center which manages the operating situations of a plurality of work machines, and also the relative position calculating apparatus 102 concerned, and the signal receiving apparatus 104 and the data storing device 105 which are mounted to each of the work machines can communicate in data with each other.

While several embodiments of the present invention have been described, the embodiments have only been presented by way of example and are not intended to limit the scope of the invention. These and other novel embodiments may be implemented in various other forms, and part of the subject matter of these embodiments may be omitted, replaced, changed or modified in various forms without departing from the scope of the invention. These embodiments and modifications thereof are embraced in the scope and gist of the invention, the embodiments and the modifications thereof also being embraced in the scope of the invention described in the appended claims. In addition, the embodiments and the modifications thereof come within the meaning and range of equivalency of the invention. Furthermore, these embodiments can also be at least partly combined, as appropriate, within the scope of the gist of the invention.

Note also that some or all of the structures, functions, processors, and the like relating to the relative position calculating apparatus 102 can be implemented by hardware. For example, the logic that executes each function may be designed by an integrated circuit. Alternatively, the relative position calculating apparatus 102 can be configured to have programs (software) that achieve each function relating to the structures of the control unit by being read and executed by an arithmetic unit, such as CPU. Data associated with the programs can be stored, for example, on a semiconductor memory (such as a flash memory and a solid state drive), a magnetic storage device (such as a hard disk drive) or a storage medium (such as a magnetic disk and an optical disc).

Further note that the control lines and information lines shown above represent only those lines necessary to illustrate the present invention, not necessarily representing all the lines required in terms of products. Thus, it can be assumed that almost all the components are in fact interconnected.

DESCRIPTION OF REFERENCE NUMERALS

101 . . . Dump truck (host-machine),
102 . . . Relative position calculating apparatus
103 . . . Communication apparatus
104 . . . Signal receiving apparatus
105 . . . Data storing device
106 . . . Position estimating portion
107 . . . Satellite selecting portion
108 . . . Position correcting portion
109 . . . Relative position calculating portion
111 . . . Dump truck (the other machine)
120 . . . GPS satellite
305 . . . Distance from auto-machine to the other machine (first satellite distance)
306 . . . Error of distance from auto-machine to satellite
307 . . . Satellite position
312 . . . Distance from the other machine to satellite (third satellite distance)
313 . . . Error of distance from the other machine to satellite
Lci . . . Correction value

The invention claimed is:

1. A relative position calculating system for work machines, comprising:
a first work machine which receives at least three of navigation signals from more than two satellites;
a second work machine which receives at least three of navigation signals from the more than two satellites; and
a relative position calculating apparatus which calculates a relative position between the first work machine and the second work machine, based on the navigation signals which the first work machine and the second work machine receive, respectively, from common satellites of the more than two satellites, the common satellites including three or more satellites of the more than two satellites, both the first work machine and the second work machine being capable of receiving the navigation signals from the more than two satellites
wherein the relative position calculating apparatus:
calculates a first satellite distance as a distance from the first work machine to the common satellites, based on the navigation signal which the first work machine receives from the common satellites;
calculates the position of the first work machine, based on the first satellite distance and on the positions of the common satellites;
calculates a second satellite distance as a distance from the first work machine to the common satellites, based on the position of the first work machine and on the positions of the common satellites;
calculates a third satellite distance as a distance from the second work machine to the common satellites, based on the navigation signals which the second work machine receives from the common satellites;
calculates the position of the second work machine, based on the third satellite distance and on the positions of the common satellites;
calculates a fourth satellite distance as a distance from the second work machine to the common satellites, based on the position of the second work machine and on the positions of the common satellites;
calculates a correction value for the first satellite distance with the second work machine as the reference, based on a difference between the first satellite distance and the second satellite distance and on a difference between the third satellite distance and the fourth satellite distance;
calculates anew the position of the first work machine, based on the correction value of the first satellite distance and on the first satellite distance; and
calculates a relative position between the first work machine and the second work machine from the anew calculated position of the first work machine and from the position of the second work machine, and wherein the calculated relative position is used by the relative position calculating system to avoid a collision between the first work machine and the second work machine.

2. The relative position calculating system for work machines according to claim 1, wherein the difference between the third satellite distance and the fourth satellite distance is smaller than the difference between the first satellite distance and the second satellite distance.

* * * * *